(12) United States Patent
Kauppinen et al.

(10) Patent No.: US 12,106,901 B2
(45) Date of Patent: Oct. 1, 2024

(54) ELECTRODE

(71) Applicant: AALTO UNIVERSITY FOUNDATION SR, Aalto (FI)

(72) Inventors: Christoffer Kauppinen, Aalto (FI); Kirill Isakov, Aalto (FI)

(73) Assignee: AALTO UNIVERSITY FOUNDATION SR, Aalto (FI)

( * ) Notice: Subject to any disclaimer, the term of this patent is extended or adjusted under 35 U.S.C. 154(b) by 0 days.

(21) Appl. No.: 17/786,824

(22) PCT Filed: Nov. 12, 2020

(86) PCT No.: PCT/FI2020/050744
§ 371 (c)(1),
(2) Date: Jun. 17, 2022

(87) PCT Pub. No.: WO2021/123493
PCT Pub. Date: Jun. 24, 2021

(65) Prior Publication Data
US 2023/0015437 A1    Jan. 19, 2023

(30) Foreign Application Priority Data
Dec. 20, 2019  (FI) ...................................... 20196117

(51) Int. Cl.
*H01G 11/26* (2013.01)
*H01G 11/34* (2013.01)
*H01G 11/48* (2013.01)

(52) U.S. Cl.
CPC ............. *H01G 11/26* (2013.01); *H01G 11/34* (2013.01); *H01G 11/48* (2013.01)

(58) Field of Classification Search
None
See application file for complete search history.

(56) References Cited

U.S. PATENT DOCUMENTS

| | | | | |
|---|---|---|---|---|
| 5,926,716 A | * | 7/1999 | Tobben | ................... H01L 28/91 438/254 |
| 2007/0075348 A1 | * | 4/2007 | Williams | ............ H01L 27/0805 257/532 |
| 2013/0164612 A1 | | 6/2013 | Tanemura et al. | |

FOREIGN PATENT DOCUMENTS

| | | |
|---|---|---|
| CN | 1773710 A | 5/2006 |
| CN | 102243967 A | 11/2011 |
| CN | 105845447 A | 8/2016 |
| CN | 107887587 A | 4/2018 |
| EP | 1355365 A2 | 10/2003 |

(Continued)

OTHER PUBLICATIONS

Search Report of Finnish Priority Application No. FI20196117, completed Aug. 18, 2020, 1 page.

(Continued)

*Primary Examiner* — Eric W Thomas
(74) *Attorney, Agent, or Firm* — Meunier Carlin & Curfman LLC

(57) ABSTRACT

The invention performs a new electrode structure that increases the surface area of the electrode. An electrode structure comprises a conductive part, a grass-like dielectric material on the conductive part, and a conductive layer on the grass-like dielectric material. The conductive part and the conductive layer is electrically connected to each other.

13 Claims, 3 Drawing Sheets

(56) References Cited

FOREIGN PATENT DOCUMENTS

Figure 1:
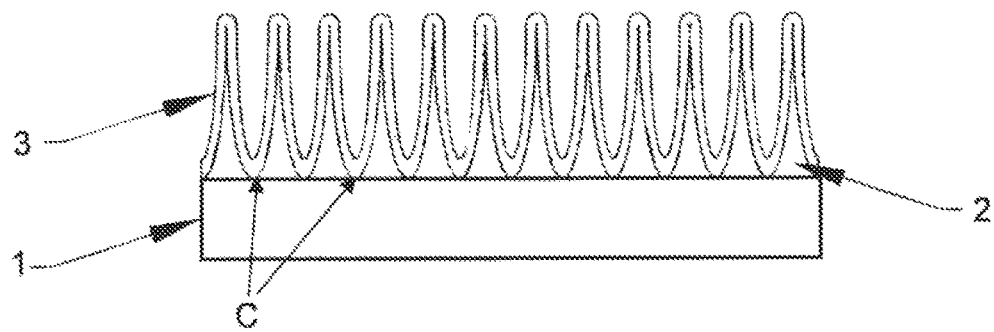

WO     20180162479 A1    9/2018
WO     2019073111 A1    4/2019

OTHER PUBLICATIONS

Written Opinion, in connection with International Application No. PCT/FI2020/050744, mailed on Sep. 9, 2021.
Lu Pai et al: "Nano fabricated silicon nanorod array with titanium nitride coating for on-chip supercapacitors", Electrochemistry Communications, Elsevier Amsterdam, NL, vol. 70, Jul. 4, 2016 (Jul. 4, 2016), pp. 51-55, XP029684831, ISSN: 1388-2481, DOI: 10.1016/J.ELECOM. 2016.07.002.
Christoffer Kauppinen et al: "Grass-like Alumina with Low Refractive Index for Scalable, Broadband, Omnidirectional Antireflection Coatings on Glass Using Atomic Layer Deposition", Applied Materials & Interfaces, vol. 9, No. 17, Apr. 18, 2017 (Apr. 18, 2017), pp. 15038-15043, XP055593977, US ISSN: 1944-8244, DOI: 10.1021/acsami.7b01733.
International Search Report and Written Opinion, in connection with International Application No. PCT/FI2020/050744, mailed on Feb. 26, 2021, 14 pages.
International Preliminary Report on Patentability, in connection with International Application No. PCT/FI2020/050744, mailed on Mar. 18, 2022.
Office Action issued by the Chinese Patent Office in the corresponding Application No. 2020800965751 on Mar. 26, 2024.

\* cited by examiner

ELECTRODE

CROSS REFERENCE TO RELATED APPLICATIONS

This application is a United States National Phase Patent Application of International Patent Application Number PCT/FI2020/050744, filed on Nov. 12, 2020, which claims the benefit of priority to Finnish National Patent Application number FI 20196117, filed on Dec. 20, 2019, both of which are incorporated by reference herein in their entireties.

FIELD OF TECHNOLOGY

The invention relates to electrodes. Especially the invention relates to a structure of an electrode.

PRIOR ART

Electrodes are used in many different applications, like in electronic components. An electrode is an electrical conductor, which can be used to make contact with a medium. The medium can be a nonmetallic part of a circuit (e.g. a semiconductor, an electrolyte, a vacuum or air), or an electrolytic solution as in a storage battery, or a solid, gas, or vacuum, for example.

The electrode is usually metal, and it may conduct current into and out of the medium if the medium is conductive or semiconductive. The electrodes are also used with dielectric material like in capacitors or with electrolytes like in supercapacitors. The electrode from which electrons emerge is called the cathode (marked as negative). The electrode that receives electrons is called the anode (marked as positive).

Electrodes are made for different purposes, for example, for fuel cells, for medical purposes, such as EEG, for electroplating, for arc welding, for grounding, for chemical analysis, or for electrolysis.

The electrodes may benefit from increasing their surface area. For example, capacitance in capacitors can be increased when having larger surface areas of the electrodes. Porous films, powders or nanoparticles have been used to achieve larger surface area of electrodes. Examples of such electrode architectures include carbon nanotubes, etched aluminum electrodes, and anodized porous films. Electrodes with increased surface-area are also desirable in such technologies as electrolysis, thermoelectric devices, fuel cells, various biological applications e.g. contacts between circuits and biological substrates.

Short Description

The object of the invention is to perform a new electrode structure that increases the surface area of the electrode. The object is achieved in a way described in the independent claim. Dependent claims illustrate different embodiments of the invention.

An electrode structure according to the invention comprises a conductive part, a grass-like dielectric material on the conductive part, and a conductive layer on the grass-like dielectric material. The conductive part and the conductive layer are electrically connected to each other. In this way the electrode structure as whole is conductive and it has a high-surface-area.

LIST OF FIGURES

Figure 2:
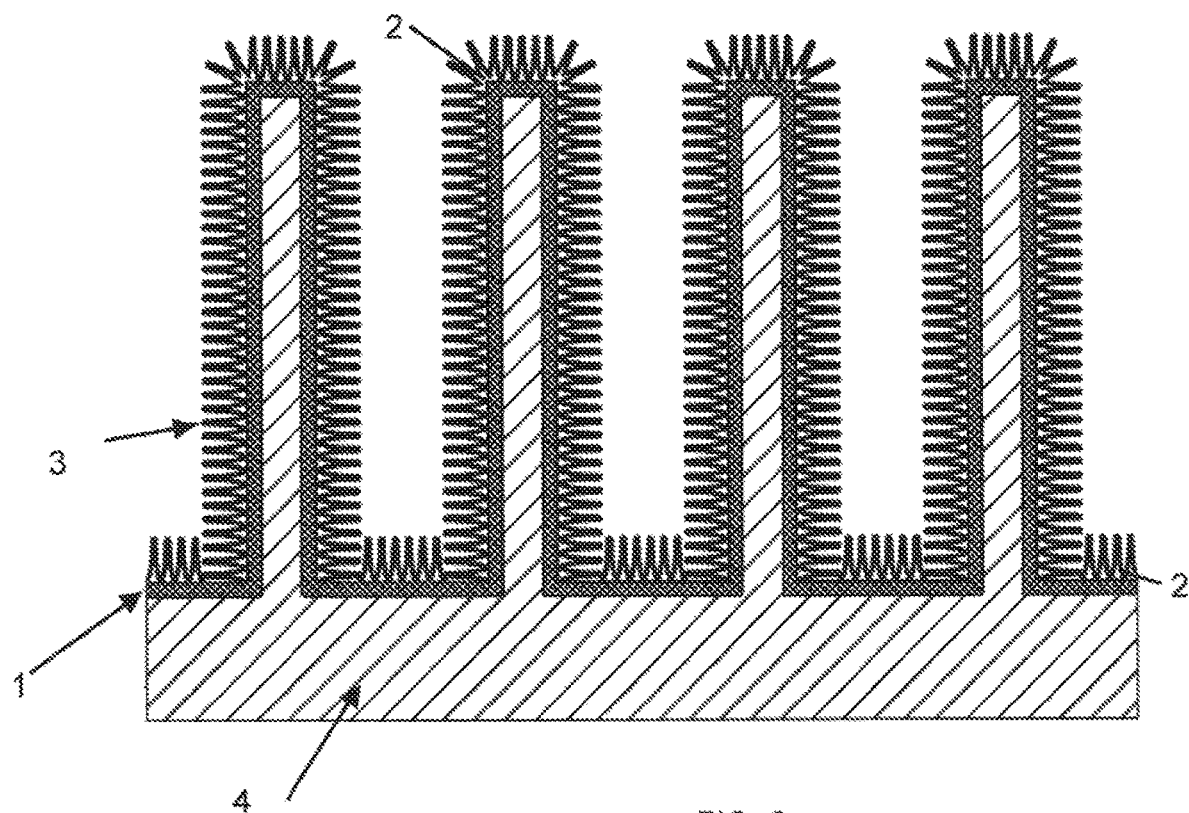
Figure 3:
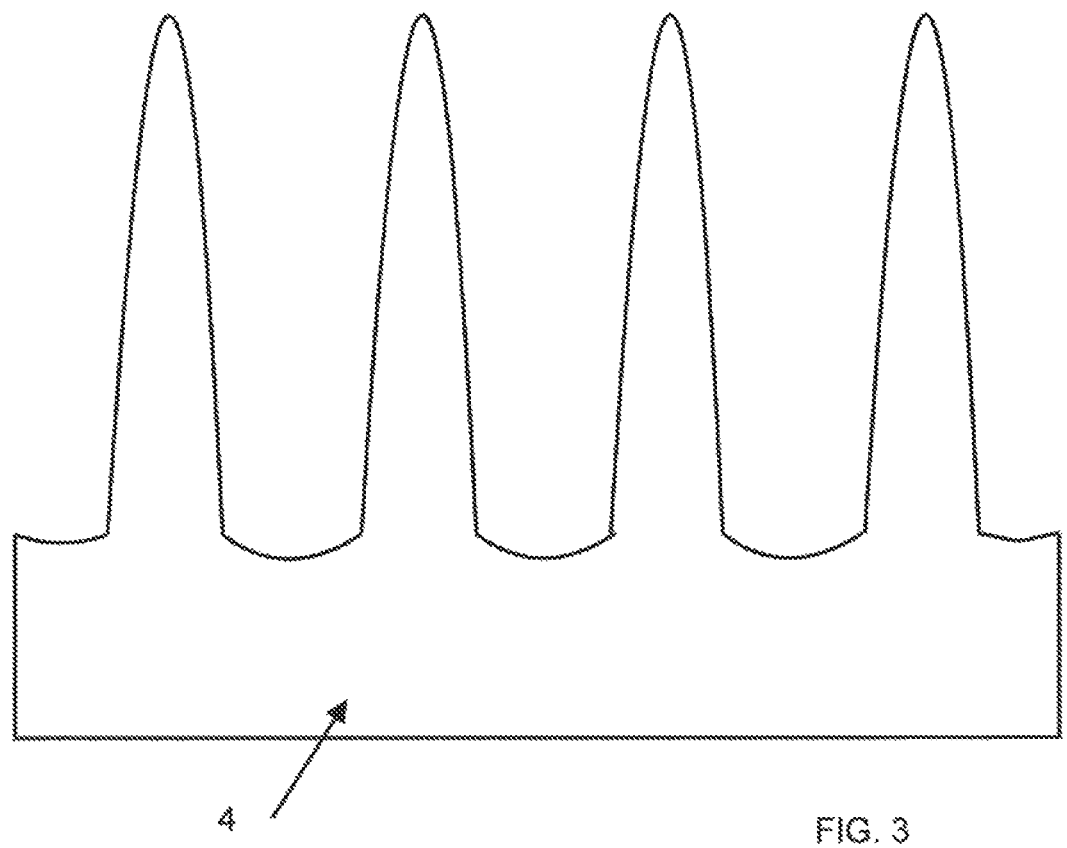
Figure 4:
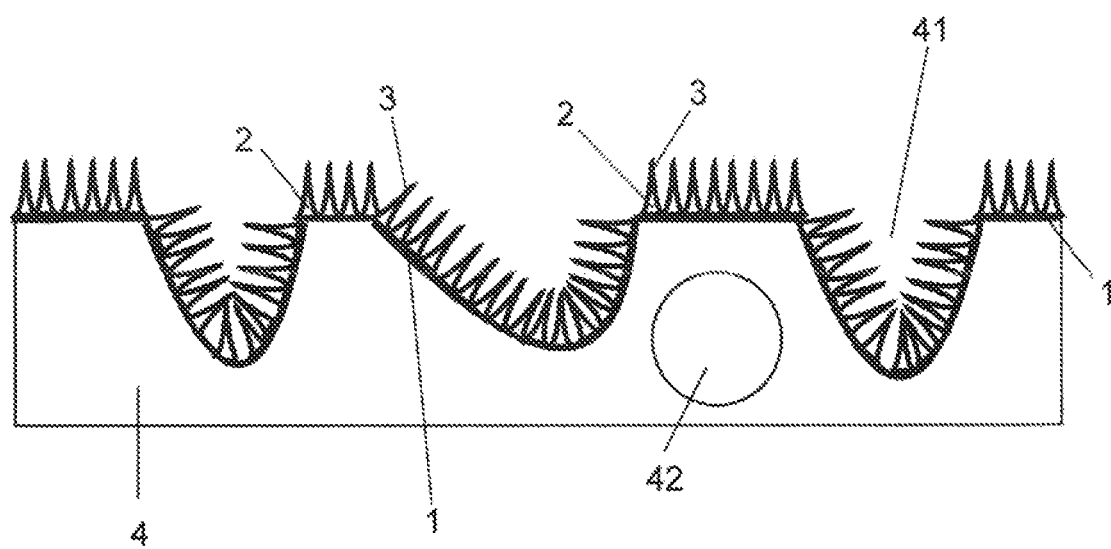
Figure 5:
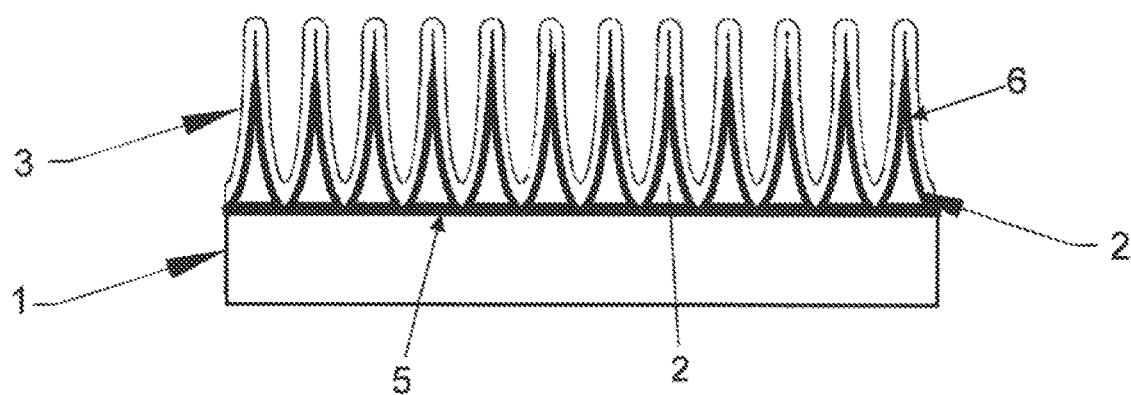
Figure 6:
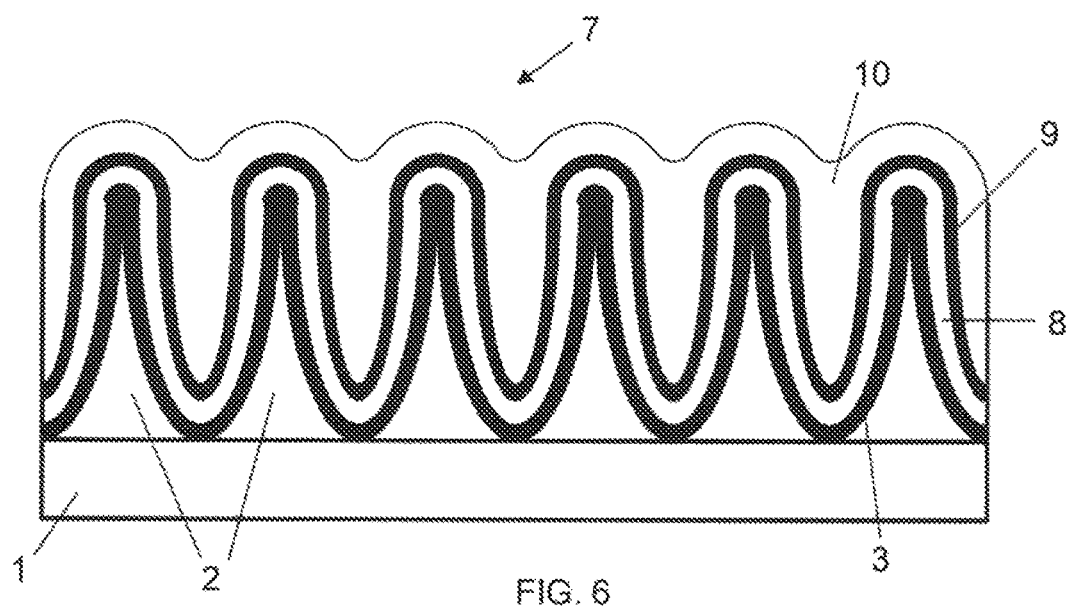
Figure 7:
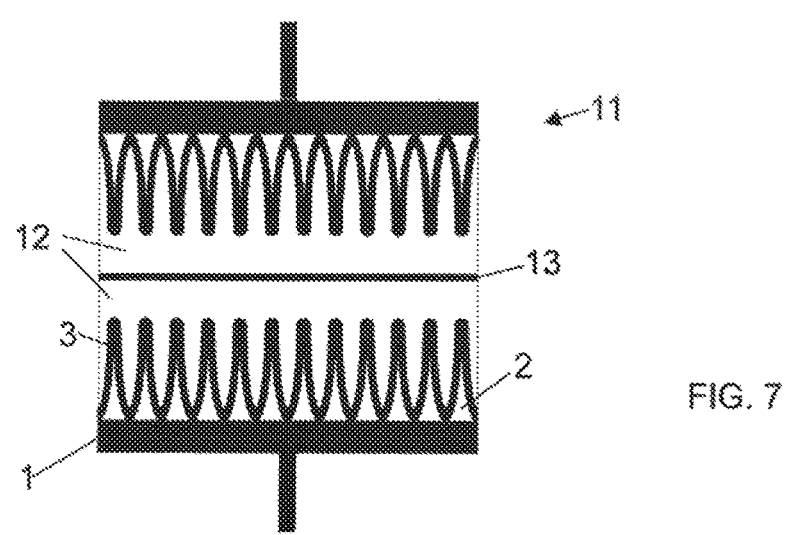

In the following, the invention is described in more detail by reference to the enclosed drawings, where FIG. 1 illustrates an example of an electrode structure according to the invention, FIG. 2 illustrates another example of the electrode structure according to the invention, FIG. 3 illustrates an example of a substrate used a part in an inventive embodiment, FIG. 4 illustrates a further example of an inventive embodiment, FIG. 5 illustrates yet another example of an inventive embodiment, FIG. 6 illustrates a schematic view of an invention used in a capacitor, and FIG. 7 illustrates a schematic view of an invention used in a supercapacitor.

DESCRIPTION OF THE INVENTION

FIG. 1 illustrates an example of an electrode structure according to the invention. An electrode structure comprises a conductive part 1, a grass-like dielectric material 2 on the conductive part 1, and a conductive layer 3 on the grass-like dielectric material. The conductive part 1 and the conductive layer 3 are electrically connected to each other. So, the electrode structure as whole is conductive and it has a high-surface-area.

A high-surface-area structure means a structure having a relatively high dimension at a perpendicular direction in relation to the plane of the structure. For example, an undulating or wave form surface provides a high-surface-area structure. The high-surface-area structure has significantly greater surface area than in a plain structure.

The grass-like material can form the high-surface-area structure. It can be alumina or silica i.e. dielectric material. In order that the electrode structure works properly, despite of the dielectric material 2, the conductive part 1 and the conductive layer 3 are in an electrical connection with each other. The connection can be a direct connection, or through a very thin layer of the grass-like material when, in practice, it does not form any resistance between the conductive layer and the conductive part. In FIG. 1 the conductive part 1 and the conductive layer 3 are in the direct connection with each other in several locations C.

Grass-like alumina is a dielectric coating with high surface area. This coating is fabricated with atomic layer deposition (ALD) of aluminium oxide and subsequent immersion into hot water. The thickness of the grass-like alumina layer primarily depends on the thickness of alumina deposited by ALD, e.g. 28 nm of deposited alumina produces about 200 nm thick grass-like alumina.

The conductive part 1 of the electrode structure can be a plain structure, like in FIG. 1, or a high-surface-area structure, like in FIG. 2. In FIG. 2 the conductive part is on a substrate structure 4 whereon it has been fixed performing a conductive layer on the substrate structure. If the substrate structure 4 is conductive, it can form the said conductive part 1, in which case a separate conductive part on it is not needed.

The high-surface-area structure can be any suitable shape. FIG. 3 shows an example of another form of the substrate structure, or the conductive part if the structure is conductive.

The substrate structure 4 can also be porous material in order to have large surface area. FIG. 4 shows an example of the porous substrate structure 4. Pores 41 on the surface are coated by the electrode structure having the conductive part 1, the grass-like dielectric material 2, and a conductive layer 3 on the grass-like dielectric material. Some pores 42 are internal, which are not coated. If the substrate structure is conductive, it is possible that it forms the conductive part 1. So, the conductive part 1 can be porous material. So, the substrate structure 4 can be a high-surface-area structure, or it can also be a plain structure. The substrate structure can be porous silicon, some ceramic structures, porous anodic alumina, carbon powder etc.

As can noted in FIGS. 2, 3 and 4 the substrate structure or the conductive part 1 having the high-surface-area structure or the porous structure is suitable for the the electrode structure, if the openings, slots, grooves or other shapes on the surface are large enough to fit the electrode structure. In other words, the openings or other shapes are larger than the thickness of the electrode structure.

The conductive part 1 is metal, TiN, doped ZnO, conductive carbon, conductive polymer, or other conductive material. The conductive layer 3 is metal, TiN, conductive carbon or other conductive material. It is also possible that the conductive layer 3 is conformal.

The electrode structure according to the invention can also comprise an additional layer 5, 6 between the conductive part 1 and the grass-like dielectric material 2, and/or the grass-like dielectric material 2 and the conductive layer 3. The additional layer/s can be used to modify adhesion between layers/parts, topography, passivation, electrical or even optical properties of the electrode structure.

The electrode structure according to the invention can be a part of a capacitor or a supercapacitor. Capacitors are passive electrical components used to store electrical energy (or charge) in an electric field. Capacitors are widely used in various electronic circuits and devices to store and supply energy, filter signals, reduce signal noise, suppress voltage spikes etc. One of the main characteristics of capacitors is their capacitance. It is possible to increase the capacitance and capacitance density of an integrated or discrete capacitor by increasing the surface area of the capacitor's electrode. The invention provides a very good solution to increase the surface area. FIG. 6 illustrates this kind of embodiment 7 in a schematic way. The capacitor has electrode, which has inventive electrode structure 1, 2, 3. On top of electrode there is dielectric material 8. On top of dielectric material 8 there is a conformal conductive film 9. On top of the film 9 there is contact 10, which is composed of metal, conductive polymer or other conductive material. The figure is schematic and real embodiments can vary from the figure. More complicated structures may have two or more inventive electrode structures.

FIG. 7 illustrates a schematic representation of embodiment of a supercapacitor with increased surface area 11. The supercapacitor has two electrodes which have inventive electrode structure 1, 2, 3. Between electrodes there are electrolyte 12 and separator 13. The figure is schematic and real embodiments can vary from the figure.

More complicated supercapacitor structures may have plain or high-surface-area substrate 4, additional layers 5 and/or 6, and greater number of inventive electrode structures 1, 2, 3.

So, when using the grass-like material for forming the high-surface-area structure, which can be dielectric material, and having the conductive part 1 and the conductive layer 3 on the both sides of the grass-like material, wherein the conductive part 1 and the conductive layer 3 are in electrically connected to each other, the electrode structure as whole is conductive and it has a high-surface-area. Although this structure itself provides the increased surface area as can be seen in FIG. 1, it is also possible to increase further the surface area by using a high-surface-area structure or a porous structure in the conductive part or in the separate substrate structure as described above.

It is evident from the above that the invention is not limited to the embodiments described in this text but can be implemented in many other different embodiments within the scope of the independent claims.

The invention claimed is:

1. An electrode structure comprising a conductive part wherein the structure comprises grass-like dielectric material comprising multiple dielectric grass-like structures or protrusions on the conductive part, and a conductive layer on the grass-like dielectric material so that surface area of the electrode is increased, the conductive part and the conductive layer being electrically connected to each other so that the electrode structure as a whole is conductive and has a high-surface area.

2. The electrode structure according to claim 1, wherein the grass-like dielectric material is alumina or silica.

3. The electrode structure according to claim 1 wherein the conductive part is a plain structure or a high-surface-area structure.

4. The electrode structure according to claim 3, wherein the conductive part is porous material.

5. The electrode structure according to claim 1, wherein the electrode structure comprises a substrate structure on whereon the conductive part has been fixed performing a conductive layer on the substrate structure.

6. The electrode structure according to claim 5, wherein the substrate structure is a plain structure or a high-surface-area structure.

7. The electrode structure according to claim 6, wherein the substrate structure is porous material.

8. The electrode structure according to claim 1, wherein the conductive part is metal, TiN, doped ZnO, conductive carbon, conductive polymer, or other conductive material.

9. The electrode structure according to claim 8, wherein the conductive layer is metal, TiN, conductive carbon or other conductive material.

10. An electrode structure according to claim 9, wherein the conductive layer is conformal.

11. The electrode structure according to claim 1, wherein the electrode structure comprises an additional layer between the conductive part and the grass-like dielectric material, and/or the grass-like dielectric material and the conductive layer.

12. The electrode structure according to claim 1, wherein the electrode structure is a part of a capacitor or a supercapacitor.

13. The electrode structure according to claim 1, wherein a proximate portion of each dielectric grass-like structure or protrusion that is adjacent to the conductive part is wider than a distal portion of the respective dielectric grass-like structure or protrusion.

* * * * *